United States Patent [19]

Fraioli

[11] 4,001,586
[45] Jan. 4, 1977

[54] THICK FILM SENSOR AND INFRARED DETECTOR

[75] Inventor: Anthony V. Fraioli, Setauket, N.Y.

[73] Assignee: Plessey Incorporated, Melville, N.Y.

[22] Filed: May 9, 1975

[21] Appl. No.: 576,011

[52] U.S. Cl. .............................. 250/345; 250/338; 338/22 SD
[51] Int. Cl.² .......................................... G01J 1/00
[58] Field of Search ......................... 250/338, 345; 338/22 SD

[56] References Cited

UNITED STATES PATENTS

| | | | |
|---|---|---|---|
| 2,075,094 | 3/1937 | Chubb | 250/338 |
| 2,765,385 | 10/1956 | Thomsen | 250/338 |
| 2,935,711 | 5/1960 | Christensen | 250/338 |
| 2,999,177 | 9/1961 | Null et al. | 250/338 |
| 3,745,360 | 7/1973 | Paul | 250/338 |
| 3,862,422 | 1/1975 | Phillip | 250/338 |
| 3,896,311 | 7/1975 | Taylor et al. | 250/338 |

*Primary Examiner*—Harold A. Dixon
*Attorney, Agent, or Firm*—James J. Burke

[57] ABSTRACT

A thermistor material is deposited and fired on a substrate, and an interdigitated pair of electrodes is deposited and fired thereover. The device is removed from the substrate and a third electrode of low thermal mass is applied on the side opposite the electrode pair. The three electrodes may be connected in a bridge circuit to form a novel, AC-generating infrared detector. When encapsulated in a header-type enclosure including a slit parallel to the electrode pair the sensor functions as an intrusion detector for moving objects. The thermistor material is preferably cobalt oxide.

17 Claims, 4 Drawing Figures

THICK FILM SENSOR AND INFRARED DETECTOR

BACKGROUND OF THE INVENTION

The present invention relates generally to thick film sensors and, more particularly, it relates to thermistors, i.e. resistive elements that are heat sensitive. Still more particularly, the invention relates to a novel thermistor structure and an infrared intrusion detector employing same.

Oxide materials having a high temperature co-efficient of resistance (TCR) are well-known. Cobaltous oxide, CoO, is one such material. It is also known that CoO in a thick film paste should be fired at a temperature not exceeding about 1350° C., in order to prevent a substantial decrease in TCR.

In the field of radiation detectors generally and infrared detectors more particularly, a variety of approaches are known. Typically, an array of serially-connected thermocouples is used to form a heat-sensitive sensor. If the application of the device is to be as an intrusion detector, where it is motion of a warm body that is to be detected and a stationary body (a light bulb, radiator or the like) is not to be detected, the sensor is associated with an array of spherical mirrors and only a signal generated by successive pulses, as caused by a body moving across the field of view of the mirror and focused successively on different sensors, triggers the alarm circuitry. Ferroelectric materials such as triglycine sulfate (TGS) are also well known in heat-sensitive sensors.

An intrusion detector including a thermocouple array and mirror focusing is disclosed in U.S. Pat. Nos. 3,792,275 and 3,760,399. A photosensitive junction device is the sensor in U.S. Pat. No. 3,704,735. A silicon disc with a crossed electrode pattern is the sensor disclosed in U.S. Pat. No. 3,529,161. A thermistor made by ion implantation is disclosed in U.S. Pat. No. 3,693,011. Typical of patents using TGS ferroelectric sensors are U.S. Pat. Nos. 3,604,933 and 3,539,803. In the latter, a field effect transistor and a high-value resistor are used to lower the normally high output impedance of ferroelectric devices.

The properties and preparation of cobalt oxide for thick film sensor applications are discussed in U.S. Pat. No. 3,345,596.

OBJECTS OF THE INVENTION

It is a general object of the present invention to provide an improved thick film sensor.

Another object of the present invention is to provide a novel thermistor structure.

A further object of the present invention is to provide an improved and simplified infrared radiation detector.

A still further object of the present invention is to provide an improved and simplified intrusion detector.

Yet another object of the present invention is to provide an improved and simplified intrusion detection system.

Various other objects and advantages of the invention will become clear from the following description of an embodiment thereof, and the novel features will be particularly pointed out in connection with the appended claims.

THE DRAWINGS

Reference will hereinafter be made to the accompanying drawings, wherein.

DESCRIPTION OF EMBODIMENTS

The present invention is based, at least in part, upon the discovery that conduction between adjacent electrodes on an oxide film such as cobalt oxide is a function of the film thickness, more particularly, decreasing conduction being observed with increasing film thickness. Thus, with the addition of a common third electrode to the backside of the film one creates, in effect, a pair of resistances with a common terminal. When the electrode pair on the top surface is screened in the form of parallel, interdigitated fingers, the equivalent circuit includes many parallel resistors on each side of the common terminal. If the resistance of these resistors is changed in seriatim as by successive exposure to thermal radiation, the resulting signal will be an alternating current.

The embodiment of the invention described hereinbelow employs cobalt oxide as the thermosensitive material, but it is to be understood that other materials that can be formed into a chip or flake having sufficient structural integrity may also be employed.

The preparation of cobalt oxide for thick film applications is well known, being discussed for example in the above-mentioned U.S. Pat. No. 3,345,596. In essence, the finely-divided powder, which may not be pure CoO as other oxides are known, is mixed with well-known organic vehicles, binders and thixotropic agents to form a screen-printable paste. For purposes of the present invention, paste preparation, whether CoO or other oxide powders are used, is entirely conventional.

While the procedure for screening the paste onto a substrate is also conventional, the substrate itself is not the conventional alumina. This is because it is ultimately necessary to remove the film from the substrate. Oxides of the type described not only bond firmly to alumina, but are believed to react therewith forming complex polynary oxides of the cobalt aluminate type. Thus, the substrate must either be one that is inert to the oxide under firing conditions or one from which the film can be removed by chemical means.

The preferred procedure is the latter, i.e. a chemical method, and a polished, silicon dioxide substrate is preferred.

Figure 1:
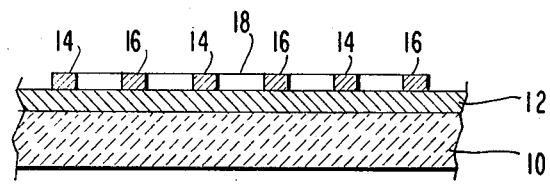
FIG. 1 is a cross-sectional elevation of a sensor of the present invention at an intermediate stage of manufacture.

With reference to FIG. 1, a silicon dioxide substrate 10 is provided, and a CoO film 12 is screened thereon. In a preferred embodiment, screen sizes, paste viscosity etc. are chosen so that film 12 is about 0.5 mils thick. Film 12 is then fired in air following standard procedures for about 5–20 minutes, at a temperature in the range of 1000° to 1300° C. Below about 1000° C., oxides other than CoO may not be decomposed, and above about 1300° C., the CoO will lose its high TCR.

Figure 2:
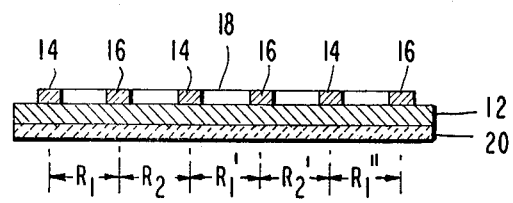
FIG. 2 is a cross-sectional elevation of a sensor of the type shown in FIG. 1 after completion and ready for installation.
Figure 3:
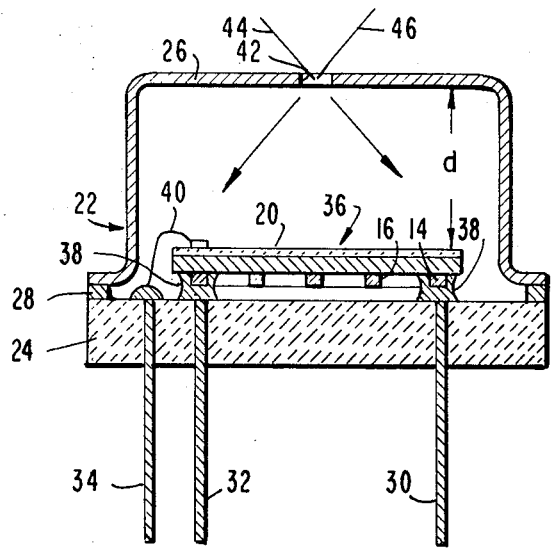
FIG. 3 is a cross-sectional elevation of an infrared detector in accordance with the present invention, considerably simplified for clarity of illustration.

Thereafter, a precious metal electrode pair is screened and fired onto the CoO film This is typically Pt, Pd, Au or mixtures or alloys of these metals, i.e. typical thick film conductors. As shown in FIGS. 1–3, the electrodes are in the form of parallel interdigitated fingers 14, 16, with all electrodes 14 connected at one end to a common bus, which is not shown as it is above the plane of the drawing, and electrodes 16 connected to a common bus 18. Electrodes 14, 16 are fired according to the manufacturer's instructions, usually at 750°–850° C. for from 5–20 minutes, in air. Commonly, electrodes 14, 16 will be 7.5 mils wide and spaced 15 mils from each other. The busses (18) will each be provided with a suitable bonding pad (not shown).

The substrate 10 can be dissolved out from under the film 12 with hydrofluoric acid. Before doing so, it is advisable to coat the top surface of the chip with a suitable wax; even though HF will not attack platinum or most of the conductor materials at an appreciable rate, such a coating essentially prevents any damage. After sufficient time, the film 12 will be completely separated from the substrate and, because of the wax (not shown) will be found floating in the HF bath.

Those skilled in the art will appreciate that at this stage the chips or flakes are quite fragile and demand special handling procedures. After removal from the HF bath and suitable rinsing, they may be inverted on glass slides, or another appropriate surface, and secured to the latter by heating the slide from the bottom to soften or partially melt the protective wax.

The next step in manufacture is the application of a bottom electrode 2 (FIG. 2), which is preferably a colloidal graphite. Paints of this material in volatile solvents are well known and do not require high-temperature processing. Further, thin coatings of colloidal graphite are suitably conductive and have a low thermal mass. It is to be noted, however, that a bottom electrode 20 in any desired pattern could be applied by electroless plating techniques through a suitable mask.

With bonding pads (not shown) associated with all three electrodes (14, 16, 20), the sensor structure of the invention per se is essentially complete.

Packaging and interconnection of such a fragile device, which for example may typically measure 0.2 in. by 0.2 in. by 0.5 mils, obviously presents certain problems; a preferred solution is illustrated in FIG. 3, though it will be appreciated that other solutions are possible. The embodiment shown in FIG. 3 is particularly adapted for use as a no-moving part, scanning sensor in an infrared intrusion detector system. It is shown in simplified form for clarity of illustration.

The package 22 is in essence a TO-type header comprising a ceramic base 24, and a metal can 26 joined with conventional metallizing and a solder preform 28, at the completion of assembly. Substrate 24 includes through-hole leads 30, 32, 34 secured by conventional means therein and in electrical connection with required metallized and plated lead patterns on the inside surface (not shown).

It can be seen from FIG. 3 that the sensor 36 is mounted with electrode 20 facing up and electrodes 14, 16 closest to substrate 24. While this can be done in several ways, it is preferred that bonding pads associated with the two busses 18 be provided with a plurality of solder "bumps" or protrusions, which correspond with similar bumps on substrate 24. When the respective parts are suitably juxtaposed and subjected to soldering temperatures, a joint 38 is produced at each point (two shown in FIG. 3). Bonding in this manner is known in integrated circuit technology. Wiring of sensor 36 within package 22 is completed by wire bonding electrode 20 with lead 34, as shown at 40, in the conventional manner.

When the can 26 is sealed onto the package, it is done with an orientation that places an elongated slit 42 in the top thereof parallel to the electrodes 14, 16 of sensor 36. A pair of arrows 44, 46 indicate the approximate "field of view" between sensors 36, and an external, moving radiant source (not shown), through the slit 42.

Figure 4:
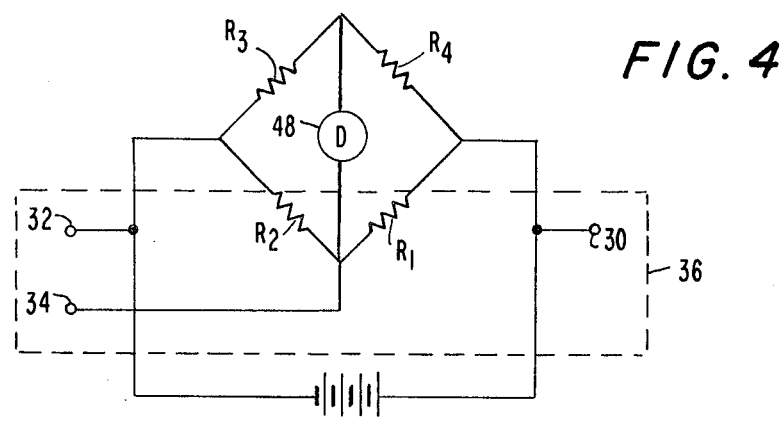
FIG. 4 is a circuit diagram of a bridge circuit for an infrared intrusion detector system in accordance with the present invention.

Operation of a scanning sensor in accordance with the invention can now be described. As shown in FIG. 2, the area beneath the first two electrodes 14, 16 constitutes resistance $R_1$, and the area beneath adjacent leads 16, 14 comprises resistance $R_2$, and adjacent areas on across the chip comprise resistance $R_1'$, $R_2'$, $R_1''$, etc. Resistance $R_1$, $R_1'$, $R_1''$ collectively comprises resistance $R_1$ in the bridge circuit of FIG. 4, with the same correspondence between the $R_2$ resistances in these figures. It is to be appreciated that all electrodes 14 are connected to lead 30 and all leads 16 are connected to lead 32 through respective busses 18.

Thus, as an external, moving radiant body moves from a position exemplified by arrow 44 to that shown by arrow 46, resistors $R_1$ and $R_2$ (FIG. 4) will rise and fall in resistance in a sinusoidal fashion. With more particular reference to FIG. 4, the dotted line indicates sensor 36 and its connection within the bridge circuit. The other half of the bridge circuit, i.e. resistors $R_3$ and $R_4$, comprises a duplicate thermistor to sensor 36, which is radiantly shielded from but thermally heat-sinked to sensor 36. Conveniently, this amounts to having a suitable enclosure (not shown) with package 22 external thereof in scanning relation to the field of view, and all remaining circuitry inside said enclosure. The number of fluctuations $n$ which a detector 48 will record as the radiant object moves between arrows 44, 46 will equal the number of electrode fingers 14 (or 16). On sensors in sizes ranging from 0.2 inch square to an inch square, $n$ will have a value in the approximate range of 10 to 50.

It will be appreciated that if the field of view includes a stationary or periodic heat source (light bulb, radiator, window etc.), activation of same will drop the resistance of the resistor in line-of-sight therewith, but no others, and will not produce an AC signal across the detector as will a moving source. It will be further appreciated that the size of slit 42 and distance $d$ (FIG. 3) between sensor 36 and slit 42 determine both the field of view and the sensitivity of the device, and may be varied for individual applications. Lastly, while slit 42 is shown as open and operation does not depend on package 22 being hermetic, there are radiation transparent cements which could be used within slit 42, thus protecting sensor 36 without impairing operation.

The design and operation of detector 48 and associated alarm circuitry are conventional and within the skill of the art.

Various changes in the details, materials, steps and arrangements of parts, which have been herein described and illustrated in order to explain the invention, may be made by those skilled in the art within the principle and scope of the invention as defined in the appended claims.

What is claimed is:

1. A temperature sensor comprising:
   a self-supporting film of an oxidic material having a high temperature coefficient of resistance;
   a pair of fired-on conductive electrodes in the form of closely-spaced, parallel interdigitated fingers on a first major surface of said film;
   a third electrode of low thermal mass substantially covering the other major surface of said film; and
   means for connecting said three electrodes into a circuit.

2. The sensor as claimed in claim 1, wherein said film is cobalt oxide.

3. The sensor as claimed in claim 1, wherein said interdigitated electrode pair is a thick film conductor selected from the group consisting of gold, palladium, platinum and mixtures and alloys thereof.

4. The sensor as claimed in claim 1, wherein said third electrode is colloidal graphite.

5. The sensor as claimed in claim 1, wherein said electrode pair includes busses connecting said interdigitated fingers and said connecting means comprise bonding pads.

6. A detector for moving radiant objects comprising:
   a thermal sensor;
   an enclosure containing said sensor; and
   means for connecting said sensor into a circuit;
   said sensor comprising:
   a self-supporting film of an oxidic material having a high temperature coefficient of resistance;
   a pair of fired-on conductive electrodes in the form of closely-spaced, parallel interdigitated fingers on a first major surface of said film;
   a third electrode of low thermal mass substantially covering the other major surface of said film;
   said enclosure retaining said sensor in a fixed, spaced and parallel relation with one wall thereof; said third electrode facing said one wall;
   an elongated narrow opening in said one wall, said opening being parallel to said interdigitated fingers of said electrode pair; and
   said connecting means comprising conductive leads connected to said three electrodes.

7. The detector as claimed in claim 6, wherein said film is cobalt oxide.

8. The detector as claimed in claim 6, wherein said interdigitated electrode pair is a thick film conductor selected from the group consisting of gold, palladium, platinum and mixtures and alloys thereof.

9. The detector as claimed in claim 6 wherein said third electrode is colloidal graphite.

10. The detector as claimed in claim 6, wherein said enclosure comprises:
    an insulating substrate having said electrode pair bonded thereto;
    leads passing through said substrate connected to said three electrodes.
    an enclosing can including said opening bonded to said substrate.

11. A detector system for moving radiant object comprising:
    a sensor comprising a first pair of radiation-sensitive film-type oxide resistors having a pair of electrodes on a first major surface and a third electrode forming a common terminal on the other major surface;
    an enclosure for said sensor including an opening spaced from said sensor and defining a field of view therefor;
    a bridge circuit including said pair of resistors as one half thereof and another pair of substantially identical resistors as the other half thereof, said other pair being isolated from incident radiation from said field of view; and
    said bridge circuit also including detector means capable of detecting sinusoidal variation in resistance of said first pair of resistors.

12. The detector system as claimed in claim 11, wherein said other pair of resistors are thermally heat-sinked to said first pair, whereby all said resistors are maintained at the ambient temperature.

13. The detector system as claimed in claim 11, wherein said sensor comprises:
    a self-supporting film of an oxidic material having a high temperature coefficient of resistance;
    a pair of fired-on conductive electrodes in the form of closely-spaced, parallel interdigitated fingers on said first major surface of said film;
    said third electrode being of low thermal mass and substantially covering said other major surface of said film;
    said third electrode facing said opening with said enclosure.

14. The detector system as claimed in claim 13, wherein said opening is a slit parallel with said interdigitated electrode fingers, a moving radiant object across said field of view generating an alternating current for said detector means.

15. The detector system as claimed in claim 13, wherein said film is cobalt oxide.

16. The detector system as claimed in claim 13, wherein said interdigitated electrode pair is a thick film conductor selected from the group consisting of gold, palladium, platinum and mixtures and alloys thereof.

17. The detector system as claimed in claim 13, wherein said third electrode is colloidal graphite.

* * * * *